(No Model.) 2 Sheets—Sheet 1.

F. T. VERHAVEN.
FISH OR GAME CARRIER.

No. 486,649. Patented Nov. 22, 1892.

Witnesses,
D. F. Mann
Frederick C. Goodwin

Inventor,
Frank T. Verhaven
By Offield Towle & Linthicum
Attys.

(No Model.) 2 Sheets—Sheet 2.
F. T. VERHAVEN.
FISH OR GAME CARRIER.
No. 486,649. Patented Nov. 22, 1892.
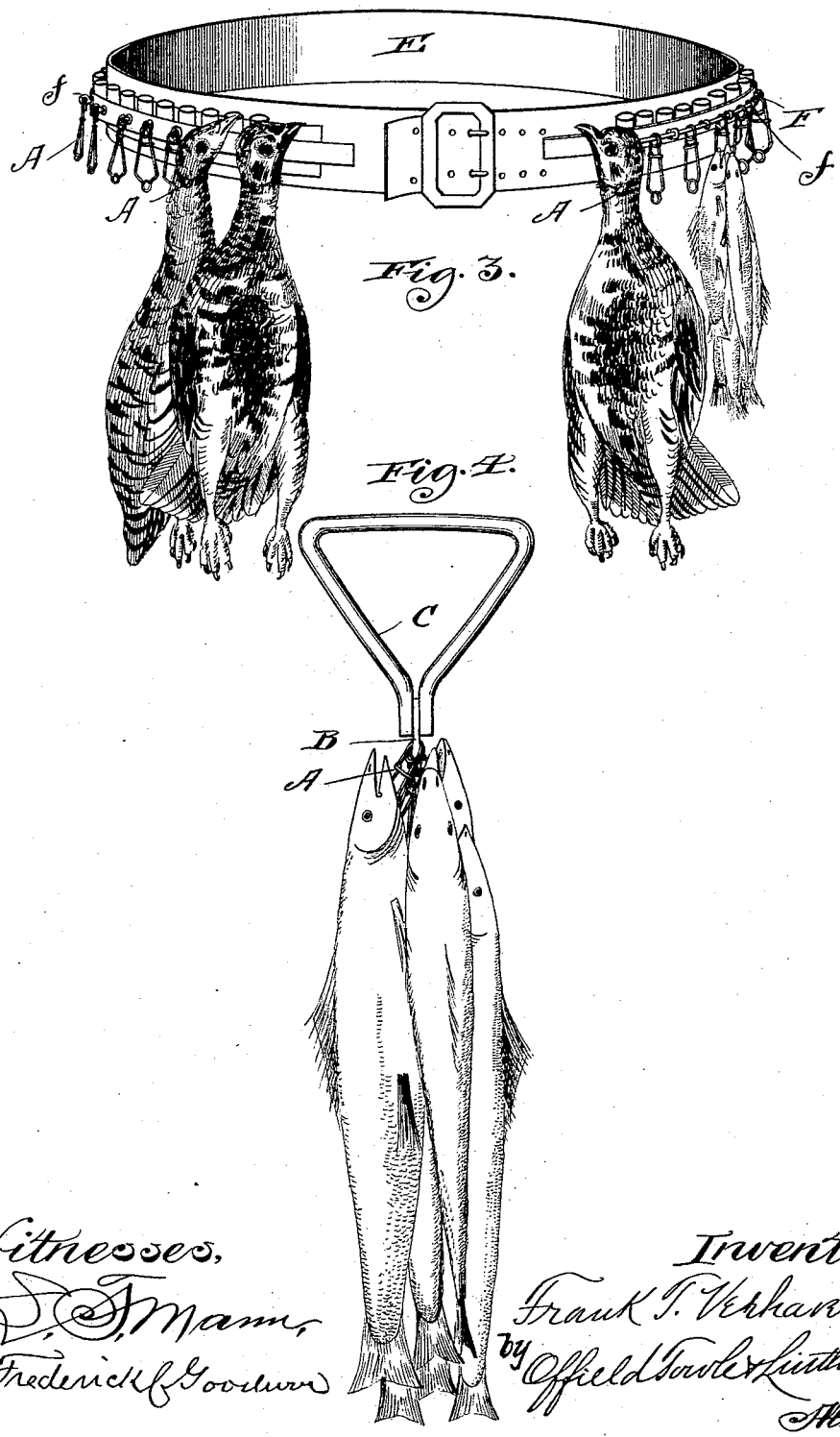
Witnesses, Inventor,
Frank T. Verhaven
by Offield Towle & Linthicum
Atty's

UNITED STATES PATENT OFFICE.

FRANK T. VERHAVEN, OF SPENCER, IOWA.

FISH OR GAME CARRIER.

SPECIFICATION forming part of Letters Patent No. 486,649, dated November 22, 1892.

Application filed September 7, 1891. Serial No. 404,947. (No model.)

*To all whom it may concern:*

Be it known that I, FRANK T. VERHAVEN, a citizen of the United States, residing at Spencer, in the county of Clay and State of Iowa, have invented certain new and useful Improvements in Fish or Game Carriers, of which the following is a specification.

My invention relates to a device for the use of sportsmen for carrying fish or game; and its object is to provide a neat, strong, and compact device which is adapted to the carrying of either fish or game-birds and so constructed that a large number can be carried easily by the hand or from a belt.

Figure 1:
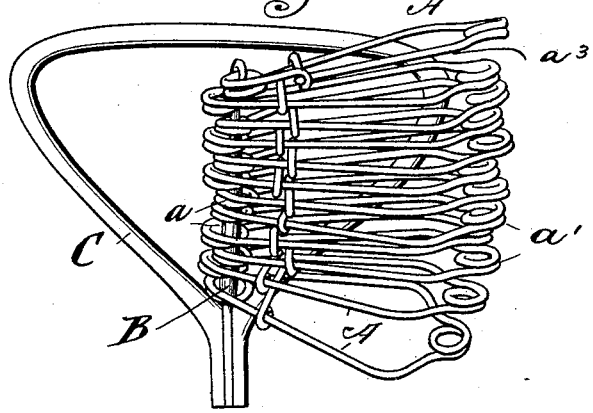
Figure 2:
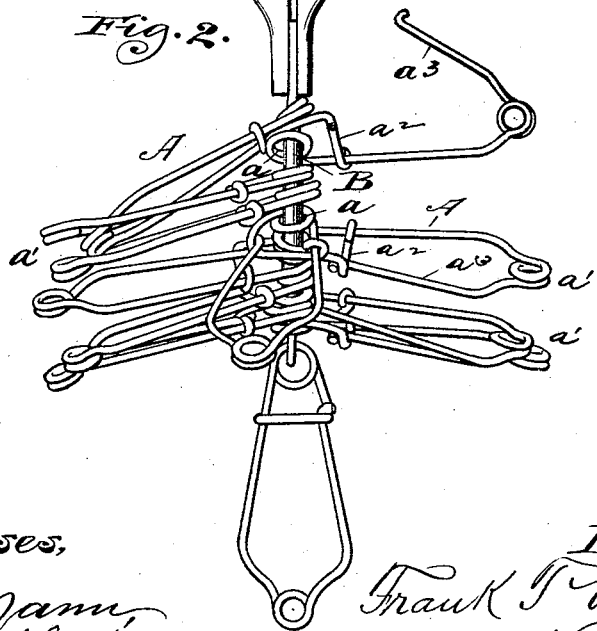

In the accompanying drawings, Figure 1 shows my carrier as constructed when it is intended to be carried by hand. Fig. 2 shows the same extended in position for use. Fig. 3 is a perspective view showing the carriers or holders applied to a belt; and Fig. 4 is a similar view, showing the hand-carrier with a string of fish thereon.

My improved carrier consists of a number of holders, each of which is constructed, preferably, from spring-wire, bent upon itself so as to provide a spring-latch which may be opened to pass through the gills of a fish or embrace the neck of a bird and then closed and caught. A number of these holders may be loosely strung upon a rod, provided, preferably, with a jointed handle, the separate holders being adapted when filled to arrange themselves radially in all directions from the rod upon which they are strung, so as to bring the fish or game into a compact body. The holders may also be strung upon a wire carried by a belt.

In the drawings, A represents the holder, which may be formed from a piece of spring-wire doubled upon itself and provided with integral coils $a\ a'$ at its ends. One of the free ends $a^2$ is bent at a right angle to the body and hooked or otherwise engaged with one of the body members, as clearly shown in the drawings. The opposite free end $a^3$, which is preferably of about two-thirds or three-quarters the length of the holder, forms a spring-latch which is adapted to engage under the bend of the portion $a^2$, which bend forms a keeper for said free end. The several holders may be strung upon a rod B, having a jointed connection with a handle C, the rod B being passed through the eyes or apertures $a$ of the holder A. In use the latch or free end $a^3$ will be released from the catch and run through the gills of a fish or made to embrace or clasp the neck of a bird, and then by springing it beneath the bend of the portion $a^2$ the bird or fish is secured by the holder, which thus forms a long loop and which will securely hold until it is released by the hand.

The invention may also be applied to a belt, as seen in Fig. 3 of the drawings, the belt being marked E and provided with a wire or cord F, held upon the belt by the keepers or staples $f$. The holder may be secured by passing the wire or cord F through the eyes $a$, and thus the holder is adapted to be supported by a belt secured upon the body of the sportsman, instead of being carried in the hand, as in the previous construction.

Without limiting my invention to the precise details of construction, I claim—

As a new article of manufacture, a fish or game carrier comprising a series of holders, each constructed from spring metal and having a latch adapted to be passed through the gills of a fish or over the neck of a bird and then to be engaged with the body of the holder, a rod or bar passing through the several holders, whereby to loosely connect and suspend them, and a handle jointed to said suspending-rod, substantially as described.

FRANK T. VERHAVEN.

Witnesses:
H. W. SMITH,
M. S. GREEN.